US012763847B2

(12) United States Patent
Charbit et al.

(10) Patent No.: US 12,763,847 B2
(45) Date of Patent: Oct. 13, 2026

(54) MULTI RTT POSITIONING PROCEDURE WITH TIMING ADVANCE FOR NTN SYSTEM

(71) Applicant: MediaTek Singapore Pte. Ltd., Singapore (SG)

(72) Inventors: Gilles Charbit, Cambridge (GB); Abdelkader Medles, Cambridge (GB); Chiao-Yao Chuang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 359 days.

(21) Appl. No.: 18/533,298

(22) Filed: Dec. 8, 2023

(65) Prior Publication Data

US 2024/0195489 A1 Jun. 13, 2024

Related U.S. Application Data

(60) Provisional application No. 63/387,107, filed on Dec. 13, 2022, provisional application No. 63/386,922, filed on Dec. 12, 2022.

(51) Int. Cl.
*H04W 56/00* (2009.01)
*G01S 13/76* (2006.01)
*H04B 7/185* (2006.01)

(52) U.S. Cl.
CPC ........ *H04B 7/18519* (2013.01); *G01S 13/765* (2013.01); *G01S 13/767* (2013.01); *H04W 56/0045* (2013.01)

(58) Field of Classification Search
CPC . G01S 13/765; G01S 13/767; H04B 7/18513; H04B 7/18519; H04W 56/0045
USPC .......................................................... 370/329
See application file for complete search history.

(56) References Cited

U.S. PATENT DOCUMENTS

| | | | | |
|---|---|---|---|---|
| 2022/0086780 | A1* | 3/2022 | Tsai | H04W 56/006 |
| 2023/0189088 | A1* | 6/2023 | Shin | H04B 7/18513 455/427 |
| 2023/0198610 | A1* | 6/2023 | Ma | G01S 5/0205 370/316 |
| 2023/0224839 | A1* | 7/2023 | Park | H04W 56/0005 370/350 |
| 2023/0413203 | A1* | 12/2023 | Ryu | H04W 56/0015 |
| 2024/0155536 | A1* | 5/2024 | Zhang | H04B 7/18513 |
| 2024/0215001 | A1* | 6/2024 | Cui | H04W 56/0045 |
| 2024/0397424 | A1* | 11/2024 | Khoshkholgh Dashtaki | H04W 76/28 |
| 2025/0247191 | A1* | 7/2025 | Khoshkholgh Dashtaki | H04L 5/0051 |

* cited by examiner

*Primary Examiner* — Robert J Lopata
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE determines multiple uplink measurement occasions for transmitting multiple reference signals to a satellite in a non-terrestrial network (NTN). The UE generates, based on Global Navigation Satellite System (GNSS) location data of the UE and ephemeris data of the satellite, multiple timing advance (TA) reports that are linked to the multiple uplink measurement occasions, respectively. The UE transmits the multiple TA reports to the satellite at multiple time points. The UE transmits the multiple uplink reference signals to the satellite on the uplink measurement occasions.

17 Claims, 9 Drawing Sheets

MULTI RTT POSITIONING PROCEDURE WITH TIMING ADVANCE FOR NTN SYSTEM

CROSS-REFERENCE TO RELATED APPLICATION(S)

This application claims the benefits of U.S. Provisional Application Ser. No. 63/386,922, entitled "MULTI RTT POSITION PROCEDURE WITH TIMING ADVANCE FOR NTN SYSTEM" and filed on Dec. 12, 2022 and the benefits of U.S. Provisional Application Ser. No. 63/387,107, entitled "MULTI RTT POSITION PROCEDURE WITH TIMING ADVANCE FOR NTN SYSTEM" and filed on Dec. 13, 2022, both of which are expressly incorporated by reference herein in their entirety.

BACKGROUND

Field

The present disclosure relates generally to communication systems, and more particularly, to techniques of determining a location of a user equipment (UE) based on a multi-round trip time (multi-RTT) positioning procedure.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5GNR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines multiple uplink measurement occasions for transmitting multiple reference signals to a satellite in a non-terrestrial network (NTN). The UE generates, based on Global Navigation Satellite System (GNSS) location data of the UE and ephemeris data of the satellite, multiple timing advance (TA) reports that are linked to the multiple uplink measurement occasions, respectively. The UE transmits the multiple TA reports to the satellite at multiple time points. The UE transmits the multiple uplink reference signals to the satellite on the uplink measurement occasions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
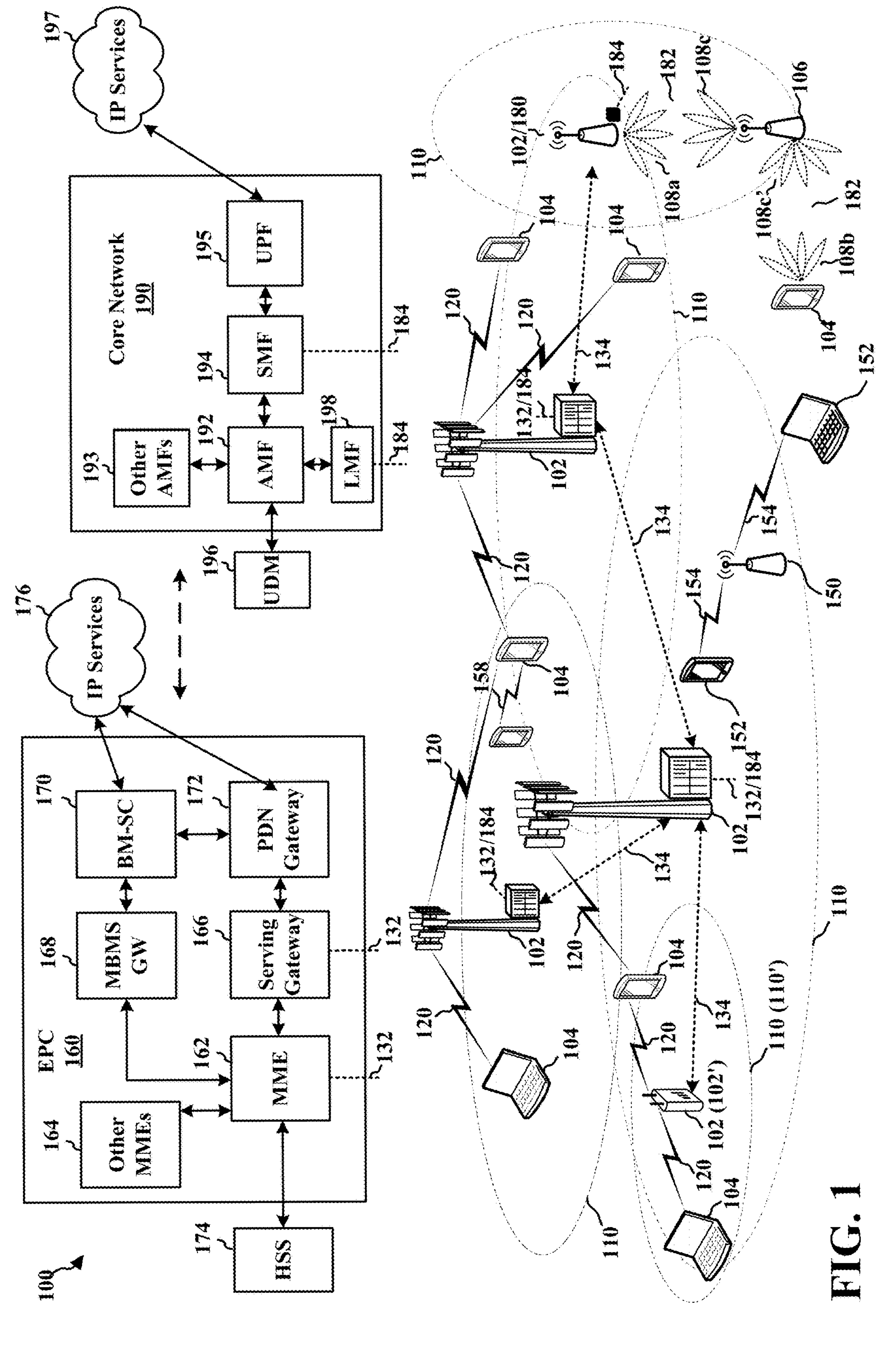
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
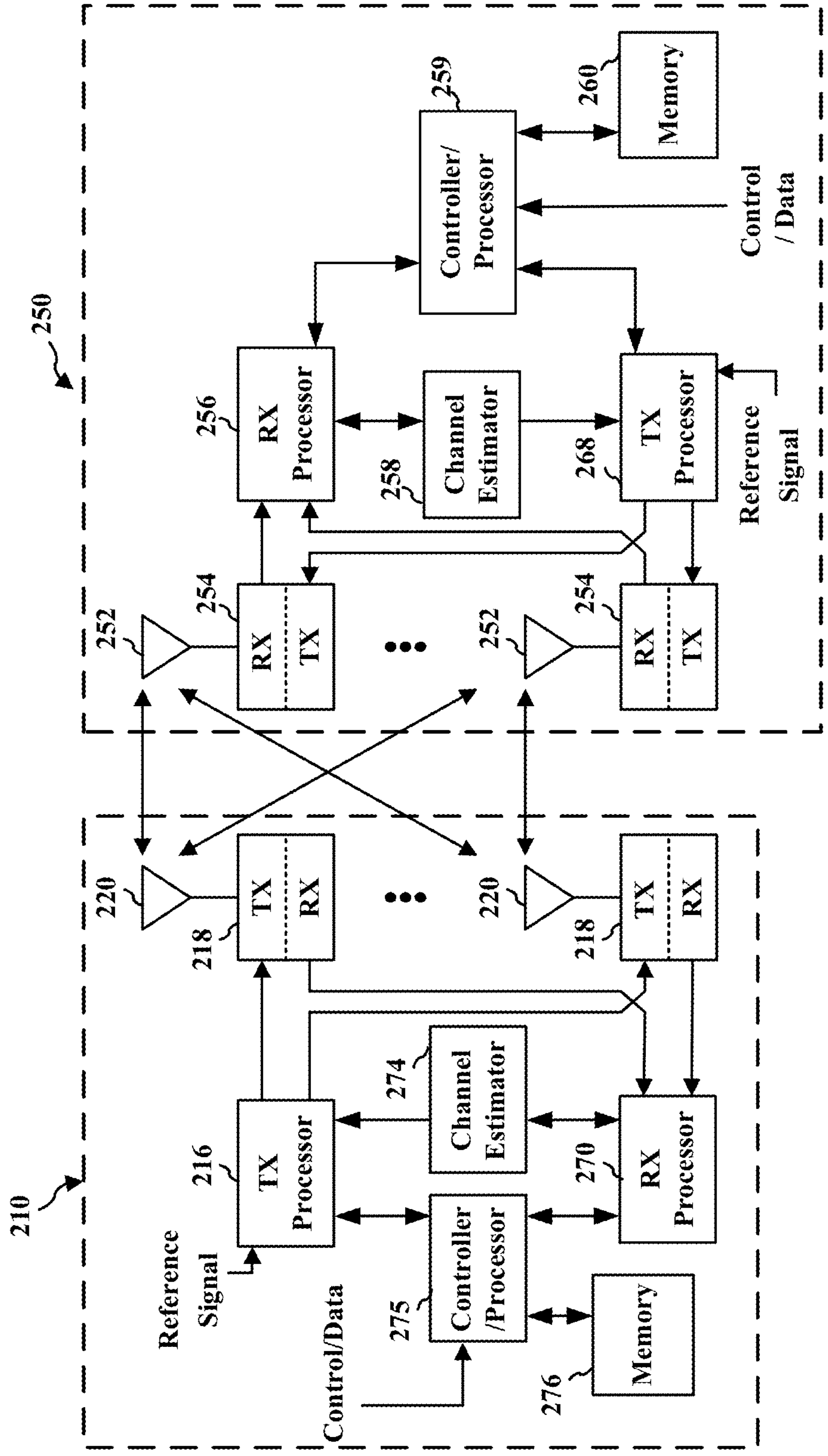
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
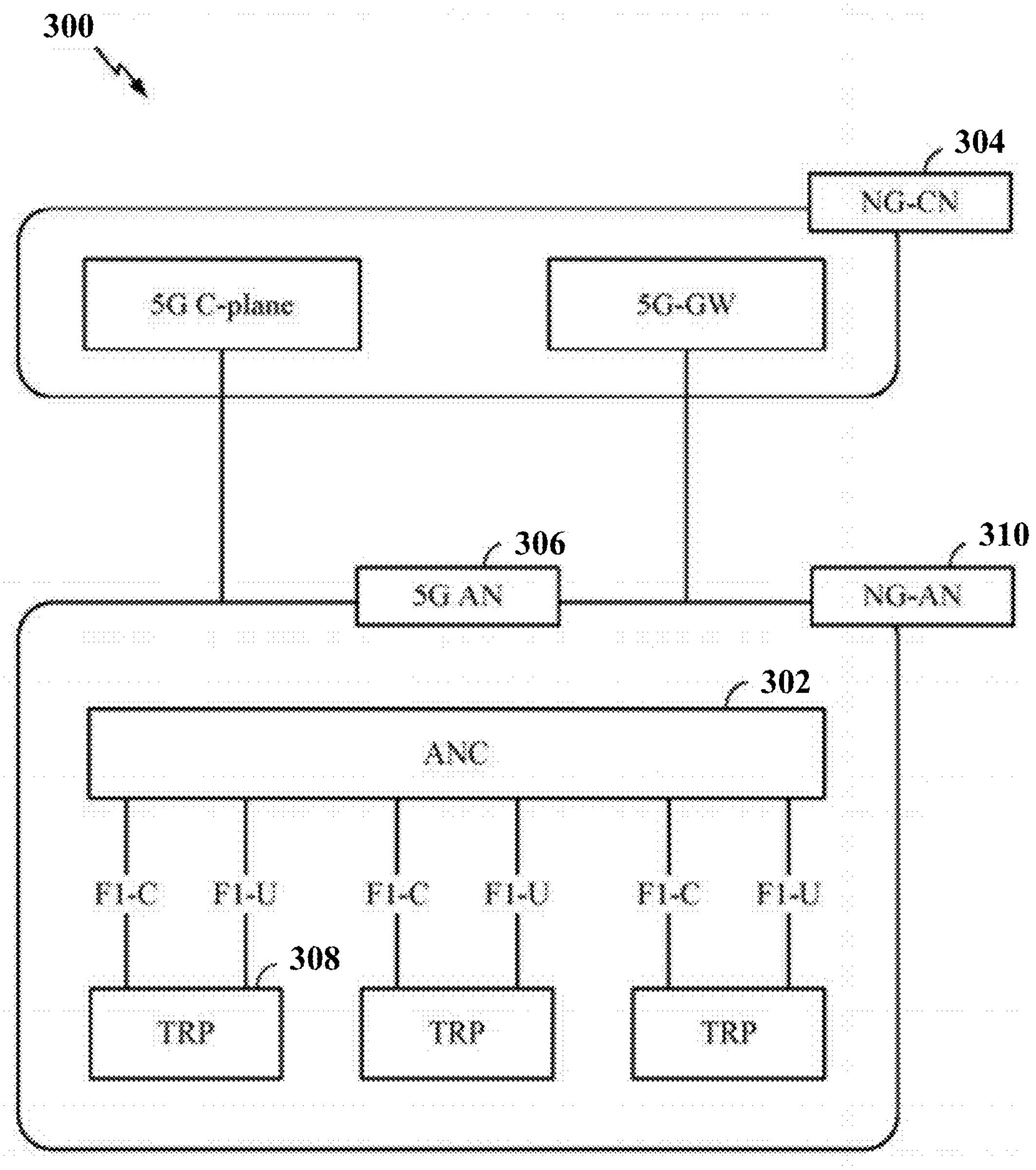
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
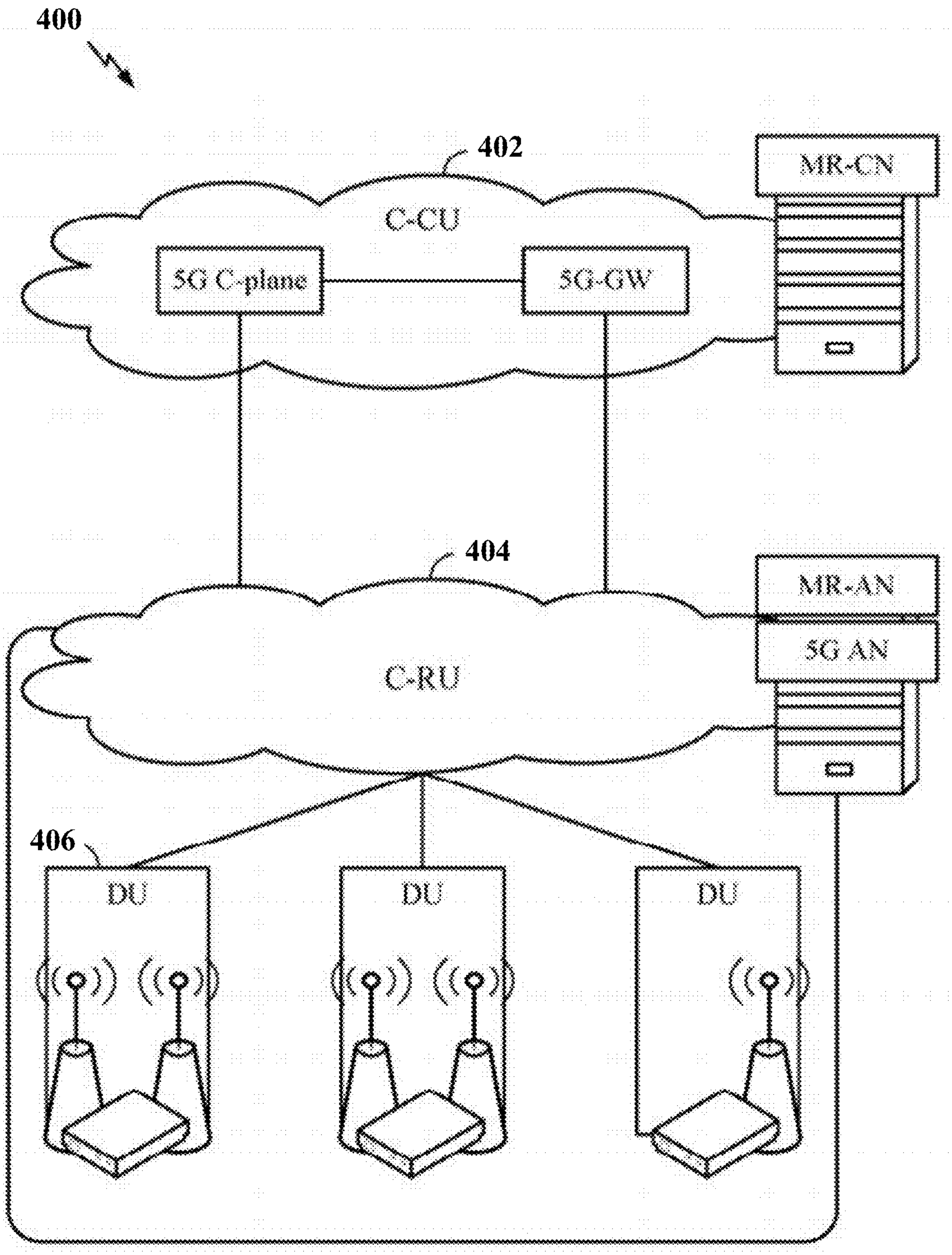
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
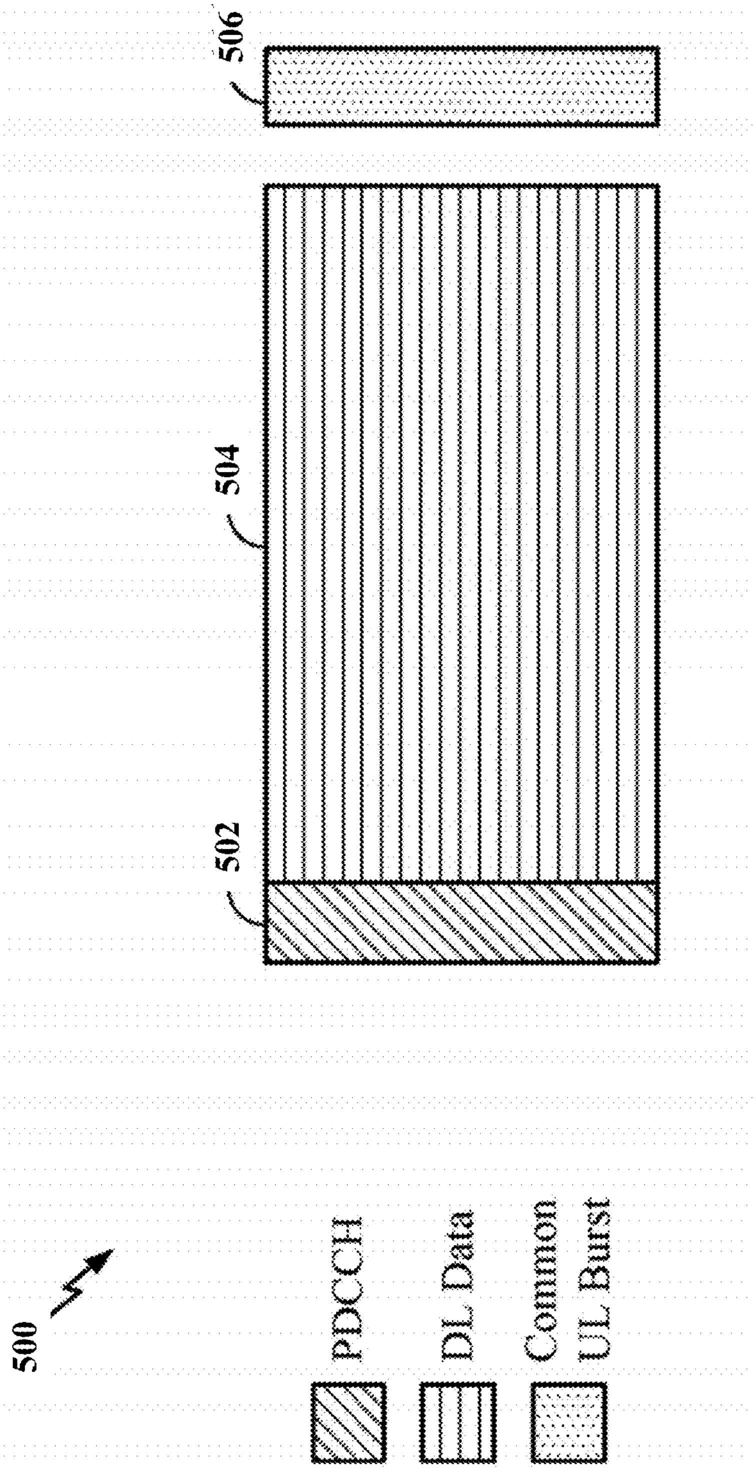
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
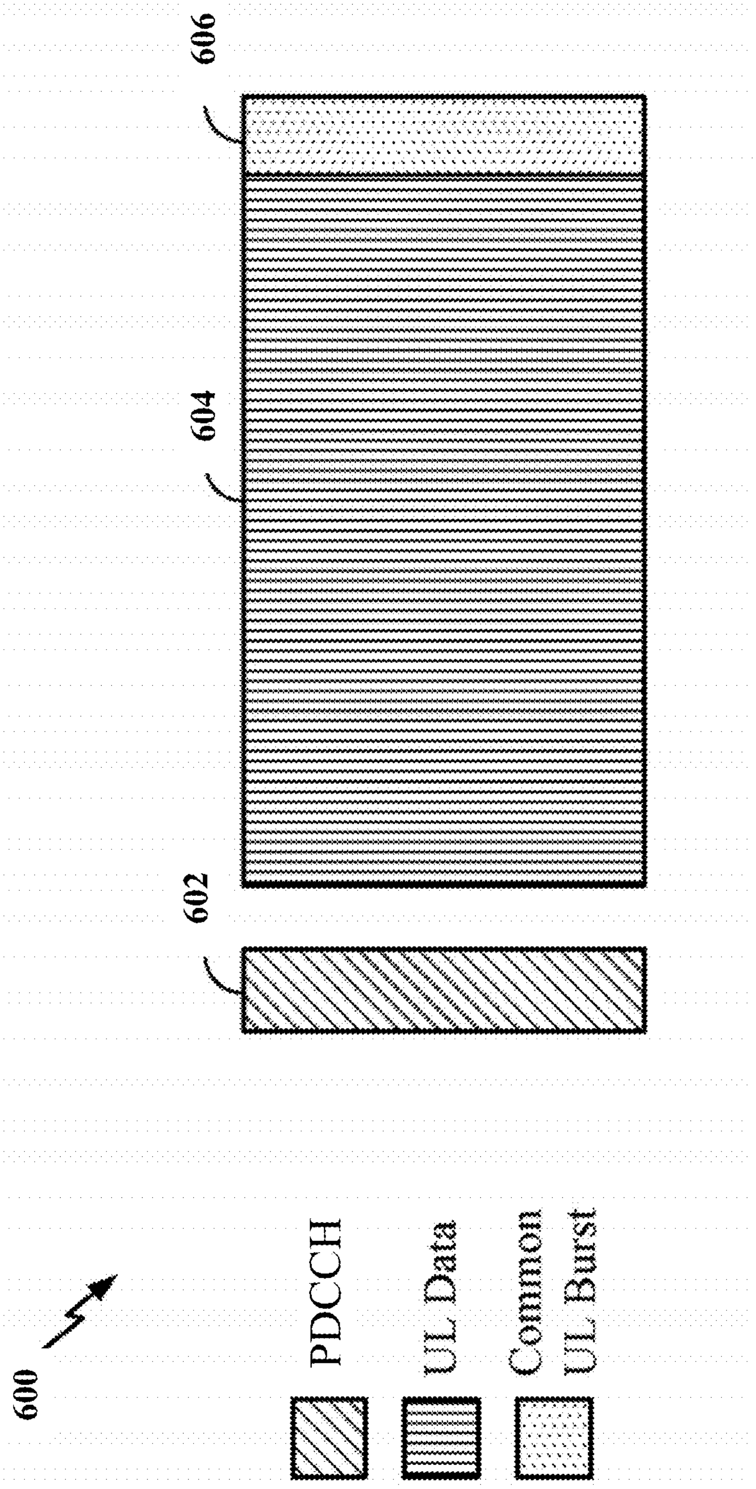
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In Non-Terrestrial Network (NTN) communication systems, the position of User Equipment (UE) is monitored and verified by the network to ensure the UE does not access a Public Land Mobile Network (PLMN) that is not authorized for use at the UE's location.

Figure 7:
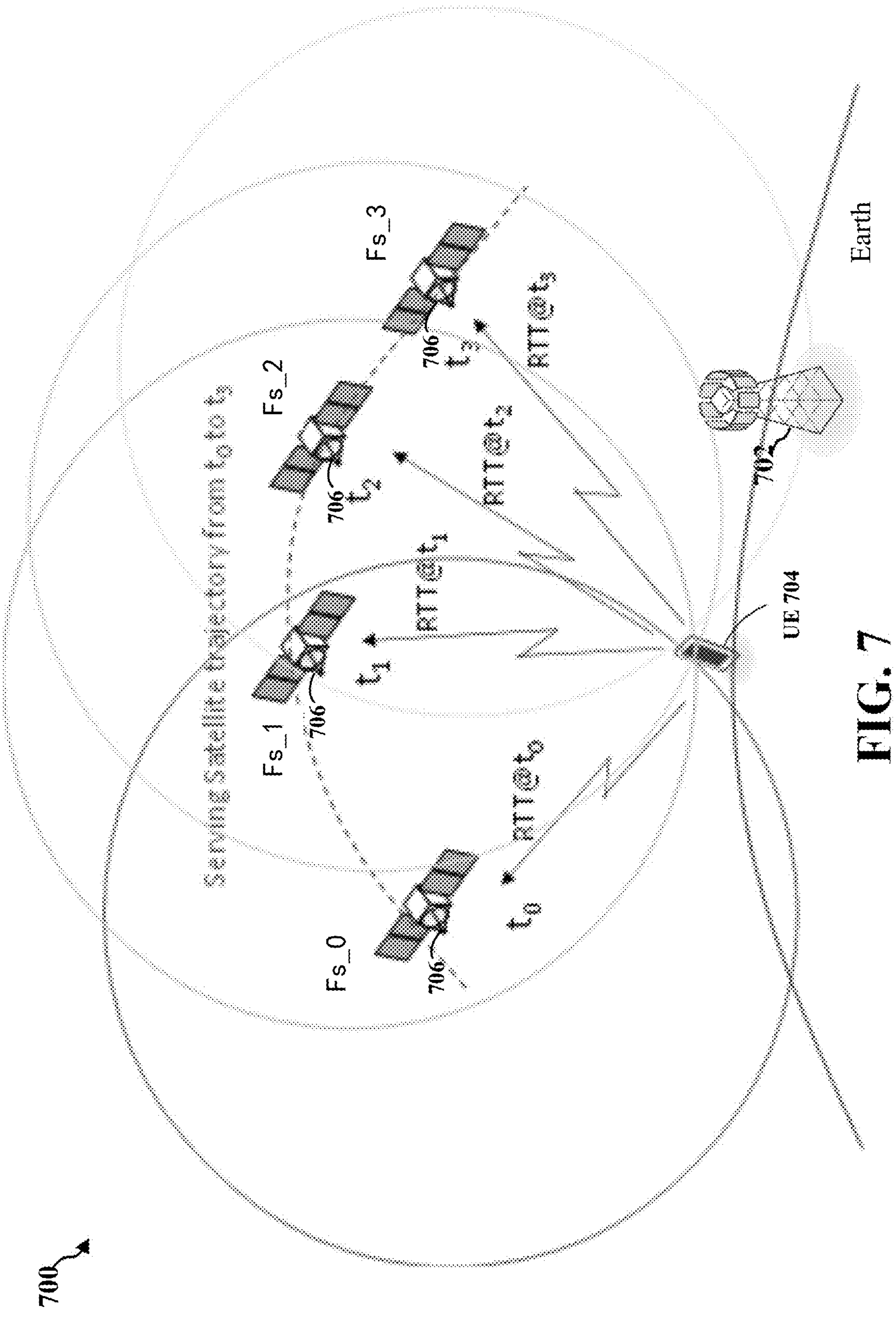
FIG. 7 is a diagram illustrating an NTN communication system.

FIG. 7 is a diagram illustrating an NTN communication system 700. A UE 704 may attempt to access a base station 702 of a PLMN through a satellite 706. The network may reject a registration attempt citing cause #78 "PLMN not allowed to operate at the current UE location." The UE 704 should add the PLMN to the list of "PLMNs not allowed to operate at the current UE location."

In cases where no other networks are available, emergency calls may still be allowed and attempted. The PLMN can also be removed from the list based on the expiry of a timer or if the UE 704 moves a sufficient distance away from where the rejection cause was received. Furthermore, after registration, the network may deregister a registered UE citing cause #78 when it detects that the UE has moved into a forbidden area, such as crossing a country's border.

For NTNs, the satellite signal coverage diameter can span hundreds of kilometers, encompassing multiple countries/PLMN boundaries. In 3GPP Rel-18 TR 38.882 "Study on requirements and use cases for network verified UE location for Non-Terrestrial-Networks (NTN) in NR," the assumed accuracy for UE location verification is 5 km to 10 km.

It is evident that the method of network-based UE location verification using Physical Cell Identity (PCI) is not highly accurate in NTN with large cells spanning several hundred kilometers. This present disclosure aims to address this issue.

In some embodiments of the invention, network verification of UE location in NR NTN using UE RX-TX (Receive-Transmit) time difference reports for multi-RTT can be considered.

For network verification of UE location in NTN based on multi-RTT using UE RX-TX time difference reports, if the UE reports required to perform multi-RTT are assumed to be trusted, the existing multi-RTT framework can be reused with functional enhancements to adapt it to the NTN context. For example, a specific definition of UE RX-TX time difference for NTN, as well as potential modifications to enable network verification of UE location without introducing any additional measurements at the UE (for example, in relation to Rel-17 NTN). The UE RX-TX time difference can be defined as $T_{UE\_RX}-T_{UE\text{-}TX}$, which is directly derived from the Timing Advance ($T_{TA}$) applied by the UE at a given subframe.

Further, the gNB (e.g., a base station 702) may transfer additional assistance data (e.g., ephemeris) from the gNB to a LMF (Location Management Function). Additional assistance data (e.g., to resolve ambiguity on mirror position issues) can also be transferred from the UE to LMF.

Further, the multi-RTT measurements may be adapted to work across multiple cells under the same satellite rather than just a single serving cell.

For network verification of UE location in NR NTN based on DL-TDOA (Downlink-Time Difference of Arrival) positioning, if the UE reports required to perform DL-TDOA positioning are assumed to be trusted, the existing DL-TDOA positioning framework can be reused with functional enhancements to adapt it to the NTN context.

In the NTN environment, the accuracy of UE propagation from Epoch Time for satellite delay are considered. The UE 704 may transmit TA reports at different periodicities to the base station 702 via the satellite 706. Table 1 shows the associated errors for different radial velocity, radial position, Doppler, and delay errors at various periodicities of the TA reports.

TABLE 1

| Periodicity | Radial Velocity Error | Radial Position Error | Doppler Error | Delay Error |
|---|---|---|---|---|
| 2 s | 0.02 m/s | 0.01 m | 0.14 Hz | 0 us |
| 5 s | 0.09 m/s | 0.17 m | 0.55 Hz | 0.0006 us |
| 10 s | 0.18 m/s | 0.82 m | 1.23 Hz | 0.003 us |
| 20 s | 0.4 m/s | 3.7 m | 2.6 Hz | 0.01 us |
| 30 s | 0.6 m/s | 8.6 m | 4.1 Hz | 0.03 us |
| 60 s | 1.3 m/s | 36.9 m | 8.9 Hz | 0.12 us |

Assuming a latency of 10 seconds for the report of at least 3 RTT reports, the accuracy can be 6*Tc. Tc, or chip time, refers to the basic time unit used to express time resolution and quantization in the 3GPP NR specification. In other words, the system can achieve an accuracy of six times the chip time (Tc) if it waits for 10 seconds to collect at least three RTT reports from the UE. The 10-second latency is the delay between the actual measurement and the time the report is received and processed.

The table lists different error sources and their values, which vary with the periodicity of the RTT reports (i.e., how frequently the RTT reports are generated):

1. "Periodicity" is the time interval between consecutive RTT measurements.
2. "Radial Velocity error" is the error in estimating the speed at which the UE is moving away from or towards the satellite.
3. "Radial Position error" is the error in estimating the UE's position relative to the satellite along the line of sight.
4. "Doppler error" is the error caused by the Doppler effect, which affects the frequency of the signal due to the relative motion between the satellite and the UE.
5. "Delay error" is the error in the time measurement, which affects the RTT calculation.

The UE has its GNSS-derived position as well as the latest satellite ephemeris data. Using this information, the UE can calculate parameters related to its motion relative to the satellites, including radial velocity, radial position, Doppler shift, and propagation delay. So the UE effectively has an accurate dynamical model it can leverage to estimate these motion-related parameters for compensating the satellite channel.

The granularity of the absolute Rel-17 NR RxTxTimeDiff report is 1, 2, 4, 8, 16, 32*Tc based on k=0, 1, 2, 3, 4, 5 values in TS 38.133 clause 10.1.25.3.1. The accuracy of Rel-17 NR UE RX-TX time difference measurements differs from the granularity of the absolute RxTxTimeDiff report in TS38.133 Clause 10.1.25.2, where:

For fading, ≥24 PRBs: 137*Tc=69.68 ns

For fading, ≥52 PRBs: 96*Tc=48.82 ns

For the multiple RTT measurements, the UE RX-TX time difference, defined as $T_{UE\text{-}RX}-T_{UE\text{-}TX}$, can be directly derived from the Timing Advance ($T_{TA}$) applied by the UE at a given subframe. This is equivalent to the Rel-17 specified UE TA report, which is the Timing Advance ($T_{TA}$) specified in TS 38.211 with a granularity of 1 ms. For NTN, $T_{UE\_RX}-T_{UE\text{-}TX}$ can be specified with a higher granularity that much smaller than 1 ms.

In this example, the satellite 706 moves along a trajectory at locations $Fs_0$, $Fs_1$, $Fs_2$, $Fs_3$, etc. at different time points $t_0$, $t_1$, $t_2$, $t_3$, etc. The UE 704 reports multiple $T_{UE\text{-}RX}-T_{UE\text{-}TX}$ at different times points $t_0$, $t_1$, $t_2$, $t_3$, etc.

$T_{TA}$ is determined from the GNSS (Global Navigation Satellite System) UE location and the ephemeris/common TA parameters valid at Epoch Time with the propagation of satellite delay from Epoch Time at the physical layer, and the closed-loop TA. Further, the UE's determination of the $T_{TA}$ and the use of the $T_{TA}$ to derive the UE RX-TX time difference can be trusted.

Figure 8:
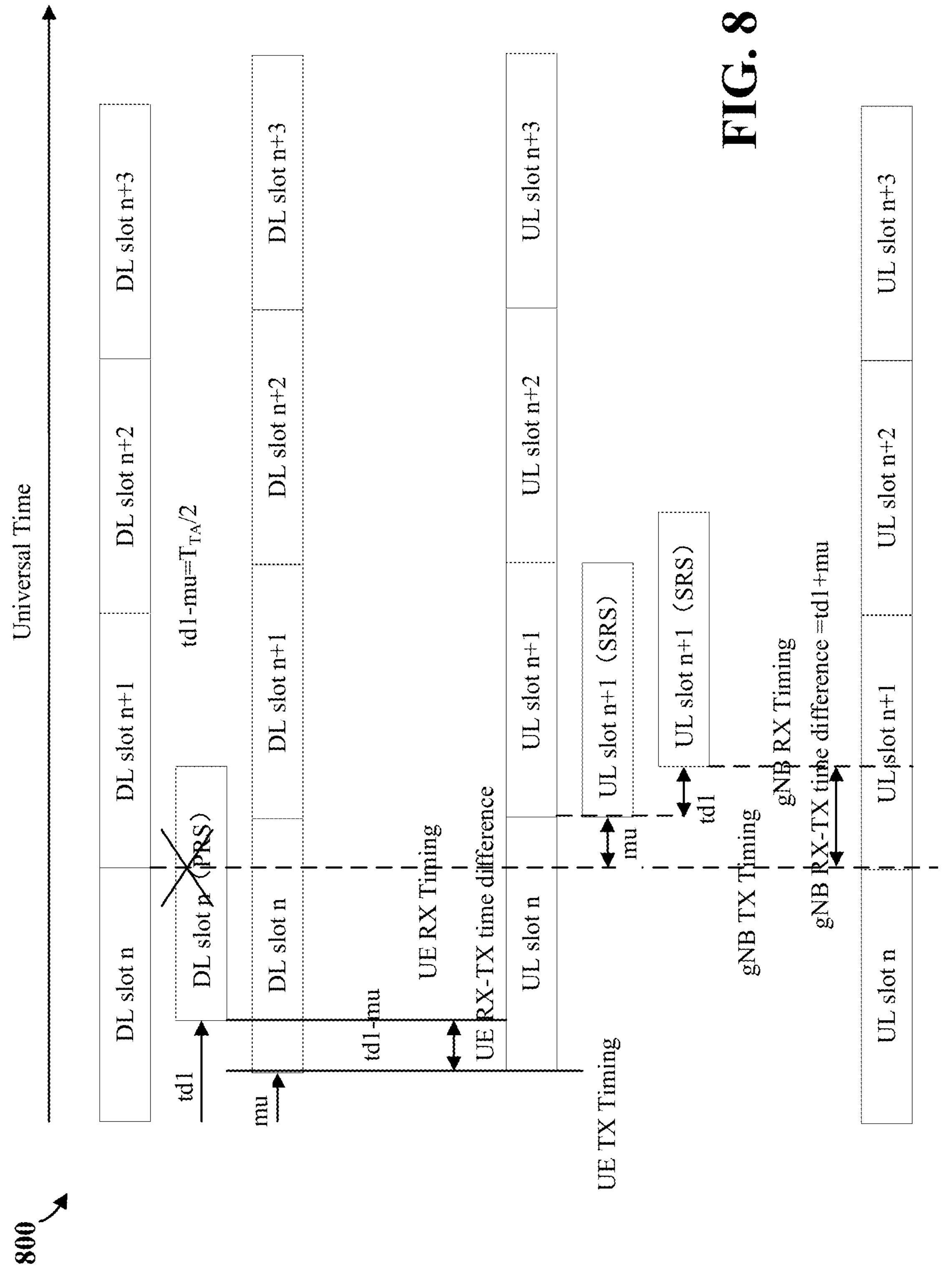
FIG. 8 is a diagram illustrating an NTN RTT positioning technique.

FIG. 8 is a diagram 800 illustrating an NTN RTT positioning technique. In particular, this technique utilizes Timing Advance (TA) for Downlink (DL) and Sounding Reference Signal (SRS) measurements for Uplink (UL). Unlike a traditional NR RTT positioning method, the NTN RTT positioning method does not use Positioning Reference Signal (PRS) measurements to determine td1 on the DL. td1 represents the one-way propagation delay from a transmission point, such as a satellite, to the User Equipment (UE). It is essentially the time it takes for a signal to travel from the transmitter to the receiver.

Instead, the UE 704 reports in a TA report the NTN UE RX-TX time difference as $T_{TA}$, which includes NTN-specific terms $$N_{TA,adj}^{UE}$$

and $$N_{TA,adj}^{common},$$

determined by the UE 704 based on UE location, satellite ephemeris, and common TA parameters broadcast on System Information Block 19 (SIB19). For UL, SRS measurements are still used. Thus, for RX-TX time difference at the satellite 706, the value is td1+μ. μ refers to the timing offset between the UE and the satellite 706/base station 702. By combining measurements from the UE 704 and satellite 706, (td1−μ+td1+μ)/2=td1 is obtained. Multiple td1 measurements are made over time as the satellite 706 moves, providing better geometric diversity. The aggregation of multiple td1 distance measurements from different positions enables multilateration to yield the precise UE location.

The Timing Advance ($T_{TA}$) used in the RTT positioning method is derived by the UE 704 based on its GNSS location and satellite ephemeris/common TA parameters broadcasted on SIB19. The UE 704 utilizes propagation to determine $T_{TA}$ from Epoch time.

The UE 704 applies $T_{TA}$ for SRS transmission for gNB measurement of gNB Rx−Tx time difference as follows:

$$T_{TA} = \left(N_{TA} + N_{TA,offset} + N_{TA,adj}^{common} + N_{TA,adj}^{UE}\right)T_c.$$

In the equation, $T_{TA}$ is the total time adjustment applied to the UE 704's uplink transmission timing. $N_{TA}$ is the basic Timing Advance value, and is often provided by the network to the UE during the initial access or can be updated via a Timing Advance Command. $N_{TA,offset}$ is an offset to the basic Timing Advance value, and can vary based on network configuration and is used to fine-tune the UE's uplink synchronization.

$$N_{TA,adj}^{common}$$

is an adjustment factor that is common to all UEs in a given area, derived from higher-layer parameters related to satellite position and motion.

$$N_{TA,adj}^{UE}$$

is an adjustment factor that is specific to the individual UE, calculated based on the UE's precise GNSS-derived location and the satellite ephemeris. $T_e$ is the the chip time. The accuracy of $T_{TA}$ is limited by the MAC CE TAC (Medium Access Control Control Element Timing Advance)=16 $T_s$=16*64$T_e$≈500 ns.

The UE 704 can report the UE RX-TX time difference linked to UL measurement occasions as $T_{UE\text{-}RX}-T_{UE\text{-}TX}=T_{TA}$. The UE 704 may use a UE RX-TX time difference granularity as defined in Rel-17 (i.e., granularity of absolute RxTxTimeDiff report is 1, 2, 4, 8, 16, 32*$T_c$ based on k=0, 1, 2, 3, 4, 5 in TS 38.133 clause 10.1.25.3.1). UL measurement occasions can be configured close to Epoch time within a timing offset configured via dedicated RRC signaling or broadcast on SIB. The timing offset can be of the order of {0, 1, . . . , N} slots.

For smaller values of N, the propagation timing error can be minimized. The broadcast satellite ephemeris data is most accurate at Epoch time. By configuring the UL measurement occasions to be as close as possible to Epoch time (small N slot offset), the ephemeris can be used to most accurately calculate the Timing Advance (TA) value. Since the UE Rx–Tx time difference is directly derived from this TA, propagating this TA to the UL measurement occasion introduces a certain timing error. This propagation timing error stems from satellite dynamics between the Epoch and measurement time. By minimizing the time offset N slots, the propagation time (and hence timing error) from the Epoch is reduced. This leads to a more precise TA estimate at the UL measurement point, minimizing the impact of satellite motion.

The ephemeris broadcast on Rel-17 NTN SIB is most accurate at Epoch time. However, there may be some small inaccuracy due to the NTN Control Center (NCC) and proprietary interference between NCC and gNB. This can be minimized with some proprietary calibration procedure in the satellite system.

UL measurement occasions can be configured slots for SRS, PRACH, DMRS if transmitted as part of multi RTT positioning configuration. The UE 704 may be triggered to re-acquire ephemeris information before starting RTT positioning procedure to report UE RX-TX time difference $T_{UE\_RX}-T_{UE\text{-}TX}$.

As described supra, the UE 704 can report the UE RX-TX time difference at multiple time points $t_0$, $t_1$, $t_2$, . . . . This procedure avoids the risk of the network sending a command TA or clock drift impairments between the time UE 704 reports UE RX-TX time difference and the UE 704 transmits SRS, where the UE can predict the $T_{TA}$up to the time the SRS is transmitted by the UE, or optimally by the time the SRS is received at the gNB.

If the base station 702 receives, via the satellite 706, the PRACH/SRS/DMRS during UL measurement occasions and receives the report of UE RX-TX time difference, the base station 702 can measure the delta due to timing error caused by the accuracy of the $N_{TA}$ term in the $T_{TA}$ formula and other impairments and add it to the UE RX-TX time difference report to the Localization Management Function (LMF) in the network to mitigate the timing error. That is, The base station 702 receives, via the satellite 706, uplink signals such as PRACH, SRS, DMRS from the UE 704 during the UL measurement occasions. In addition, the base station 702 receives the UE's report of its Rx–Tx time difference, which is derived from the $T_{TA}$. However, there will be some timing error in this reported $T_{TA}$ from the UE 704. This error is caused by two factors—the accuracy limit of the $N_{TA}$ term used in the $T_{TA}$ formula itself (MAC CE accuracy limit), as well as other impairments such as satellite drift since Epoch time when the ephemeris was valid. To address this, the base station 702 can measure the difference ("delta") between the expected timing based on the UE's reported $T_{TA}$ value and the actual timing based on the base station 702's own UL signal measurements from PRACH/SRS/DMRS. This quantified delta timing error can then be added to the UE 704's originally reported $T_{TA}$-based Rx–Tx time difference value. The base station 702 sends this corrected measurement with reduced timing error to the network LMF. By compensating for inaccuracies in this manner, it allows the LMF to mitigate the overall timing errors and achieve better accuracy in determining the UE 704's position. The base station 702 can report the measured RX-TX time difference from PRACH/SRS/DMRS at the satellite 706 to LMF in the network during UL measurement occasions.

The UE RX-TX time difference report linked to Epoch time can be optionally omitted in NTN if the delta due to timing error caused by the accuracy of the $N_{TA}$ term in the $T_{TA}$ formula (i.e., up to 16 $T_s$) can be known a priori by the network.

The technique described supra allows the device to report the RTT derived from the calculated Timing Advance using GNSS UE location and satellite ephemeris up to the time the SRS is transmitted by the UE, or up to the time the SRS is received at the gNB. This method mitigates timing error introduced due to satellite movement between the time the conventional RTT UE RX-TX time difference based on PRS measurements is reported and the time the gNB makes measurements with SRS. This method also avoids the need for PRS measurements in the UE, where the UE can simply synchronize on the DL using SSB/Tracking Reference signal and calculate the Timing Advance from GNSS UE location and satellite ephemeris/common TA parameters, and derive the RTT UE RX-TX time difference directly from the TA. This technique can be used for single RTT UE position verification and/or positioning or aid to positioning, as well as in multiple satellite measurement cases, for UE position verification and/or positioning or aid to positioning.

As described supra, the UE Rx–Tx time difference (downlink RTT) is linked to the timing of uplink Sounding Reference Signals (SRS) received at the base station 702 via the satellite 706. By doing so, the technique aims to minimize the temporal gap between the TA (Timing Advance) report—representing the downlink RTT—and the reception of SRS at the gNB.

The significance of linking these measurements lies in the mitigation of satellite timing drift. Satellite timing drift refers to the changes in signal timing due to the relative motion of the satellite with respect to the UE 704 and the base station 702. This drift can introduce errors in the timing measurements, which, if uncorrected, could lead to misalignment between the UE's transmissions and the network's timing, resulting in potential communication failures or reduced performance.

By aligning the downlink RTT measurements with the uplink SRS, the system effectively narrows the window during which timing drift could affect the measurements. This tighter integration of downlink and uplink timing helps ensure that the UE's transmission timing remains consistent with the network's timing, despite any satellite movement that occurs between the downlink and uplink measurement instances.

Further, as described supra, another NTN-specific enhancement is the ability to configure the UE measurement occasion to align closely with Epoch time. Epoch time refers to a specific instant at which the satellite ephemeris data is most accurate. The UE's measurement occasion is the time at which it is scheduled to perform certain measurements, such as the Timing Advance (TA).

This configuration is achieved using dedicated Radio Resource Control (RRC) signaling or by broadcasting on a System Information Block (SIB). The UE benefits from the highest accuracy of the satellite ephemeris, which is available at Epoch time. By scheduling the UE measurement occasion close to this moment, the system provides that the prediction for the TA, calculated by the UE based on its GNSS-derived position and the satellite ephemeris, is more accurate. This precision helps the UE correctly adjust its uplink transmission timing to account for the propagation delays inherent in satellite communication.

The accuracy of the ephemeris data diminishes with time since the epoch due to the natural movement of the satellites and the dynamic environmental conditions in space. By aligning the measurement occasions with Epoch time, the system minimizes the potential error in the TA report due to any inaccuracies in the ephemeris data that may develop over time.

Figure 9:
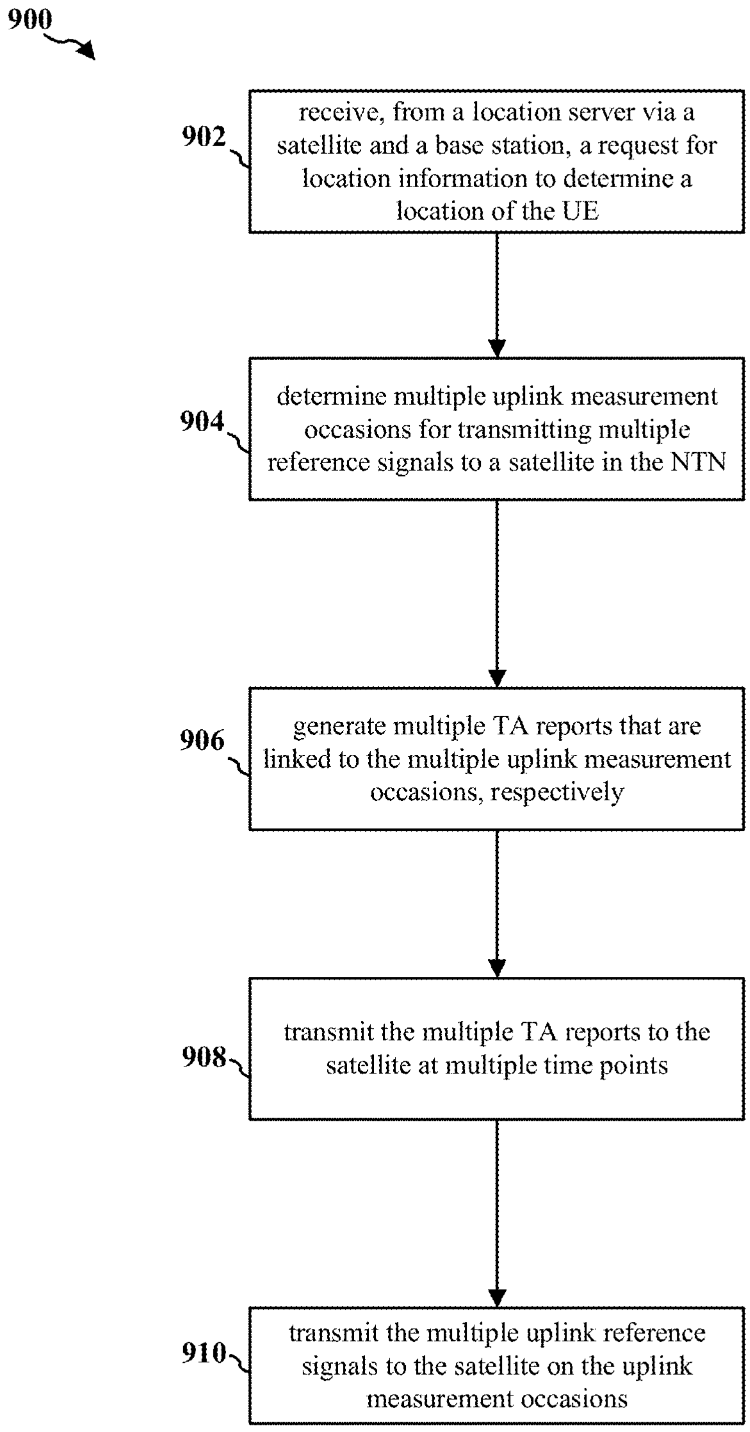
FIG. 9 is flow chart of a method (process) for a reporting location information of a UE in a NTN.

FIG. 9 is a flow chart 900 of a method (process) for reporting location information of a UE in a non-terrestrial network (NTN). The method may be performed by the UE (e.g. the UE 704). In certain configurations, in operation 902, the UE receives, from a location server via a satellite and a base station, a request for location information to determine a location of the UE. In operation 904, the UE determines multiple uplink measurement occasions for transmitting multiple reference signals to a satellite in the NTN. In operation 906, the UE generates, based on Global Navigation Satellite System (GNSS) location data of the UE and ephemeris data of the satellite, multiple timing advance (TA) reports that are linked to the multiple uplink measurement occasions, respectively. In operation 908, the UE transmits the multiple TA reports to the satellite at multiple time points. In operation 910, the UE transmits the multiple uplink reference signals to the satellite on the uplink measurement occasions.

In certain configurations, each of the multiple TA reports contains a TA value that represents a time interval between when the UE receives a downlink signal from the satellite and when the UE transmits an uplink signal in a corresponding uplink slot to the satellite. In certain configurations, the TA value is determined partially based on a common timing adjustment factor derived from satellite position parameters in the ephemeris data, and a UE-specific timing adjustment factor calculated based on a position of the UE determined from the GNSS location data. In certain configurations, the TA value in each of the multiple TA reports is associated with a time point that is within a predetermined offset from a corresponding uplink measurement occasion of the multiple measurement occasions.

In certain configurations, the multiple uplink reference signals comprise at least one of multiple Sounding Reference Signals (SRSs), multiple Physical Random Access Channels (PRACHs), and multiple Demodulation Reference Signal (DMRSs). In certain configurations, the multiple uplink measurement occasions are determined to be within a predetermined offset from Epoch time of the satellite.

In certain configurations, the UE receives a trigger to acquire updated ephemeris data of the satellite prior to generating the multiple TA reports. In certain configurations, a time difference between transmitting each of the multiple TA reports and transmitting a corresponding one of the multiple uplink reference signals is less than a threshold to mitigate impact of timing drift caused by movement of the satellite. The timing drift comprises at least one of clock drift of the UE and Doppler shift due to the movement of the satellite. In certain configurations, the UE predicts the TA value in each of the multiple TA reports up to a time instance when a corresponding one of the multiple uplink reference signals is received by a base station via the satellite.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

determining multiple uplink measurement occasions that are within a predetermined offset from an Epoch time of a satellite, the predetermined offset corresponding to a number of slots, for transmitting multiple reference signals to the satellite in a non-terrestrial network (NTN);

generating, based on Global Navigation Satellite System (GNSS) location data of the UE and ephemeris data of the satellite, multiple UE Rx–Tx time difference reports, each of the multiple UE Rx–Tx time difference reports containing a respective timing advance (TA) value, that are linked to the multiple uplink measurement occasions, respectively;

predicting the TA value in each of the multiple UE Rx–Tx time difference reports up to a time instance when a corresponding one of the multiple uplink reference signals is received by a base station via the satellite;

transmitting the multiple UE Rx–Tx time difference reports to the satellite at multiple time points; and transmitting the multiple uplink reference signals to the satellite on the uplink measurement occasions.

2. The method of claim 1, wherein each of the multiple UE Rx–Tx time difference reports contains the respective TA value, the respective TA value representing a time interval between when the UE receives a downlink signal from the satellite and when the UE transmits an uplink signal in a corresponding uplink slot to the satellite.

3. The method of claim 2, wherein the TA value is determined partially based on:

a common timing adjustment factor derived from satellite position parameters in the ephemeris data; and a UE-specific timing adjustment factor calculated based on a position of the UE determined from the GNSS location data.

4. The method of claim 2, wherein the TA value in each of the multiple UE Rx–Tx time difference reports is associated with a time point that is within a predetermined report offset from a corresponding uplink measurement occasion of the multiple uplink measurement occasions.

5. The method of claim 1, wherein the multiple uplink reference signals comprise at least one of multiple Sounding Reference Signals (SRSs), multiple Physical Random Access Channels (PRACHs), and multiple Demodulation Reference Signal (DMRSs).

6. The method of claim 1, further comprising receiving a trigger to acquire updated ephemeris data of the satellite prior to generating the multiple UE Rx–Tx time difference reports.

7. The method of claim 1, wherein a time difference between transmitting each of the multiple UE Rx–Tx time difference reports and transmitting a corresponding one of the multiple uplink reference signals is less than a threshold to mitigate impact of timing drift caused by movement of the satellite.

8. The method of claim 7, wherein the timing drift comprises at least one of clock drift of the UE and Doppler shift due to the movement of the satellite.

9. The method of claim 1, further comprising receiving, from a location server via the satellite and a base station, a request for location information to determine a location of the UE, wherein generating the multiple UE Rx–Tx time difference reports and transmitting the multiple uplink reference signals are in response to receiving the request for location information.

10. An apparatus for wireless communication, the apparatus being a user equipment (UE), comprising:

a memory; and at least one processor coupled to the memory and configured to:

determine multiple uplink measurement occasions that are within a predetermined offset from an Epoch time of a satellite, the predetermined offset corresponding to a number of slots, for transmitting multiple reference signals to the satellite in a non-terrestrial network (NTN);

generate, based on Global Navigation Satellite System (GNSS) location data of the UE and ephemeris data of the satellite, multiple UE Rx–Tx time difference reports, each of the multiple UE Rx–Tx time difference reports containing a respective timing advance (TA) value, that are linked to the multiple uplink measurement occasions, respectively;

predict the TA value in each of the multiple UE Rx–Tx time difference reports up to a time instance when a corresponding one of the multiple uplink reference signals is received by a base station via the satellite;

transmit the multiple UE Rx–Tx time difference reports to the satellite at multiple time points; and transmit the multiple uplink reference signals to the satellite on the uplink measurement occasions.

11. The apparatus of claim 10, wherein each of the multiple UE Rx–Tx time difference reports contains the respective TA value, the respective TA value representing a time interval between when the apparatus receives a downlink signal from the satellite and when the apparatus transmits an uplink signal in a corresponding uplink slot to the satellite.

12. The apparatus of claim 11, wherein the at least one processor is further configured to determine the TA value partially based on:

a common timing adjustment factor derived from satellite position parameters in the ephemeris data; and an apparatus-specific timing adjustment factor calculated based on a position of the apparatus determined from the GNSS location data.

13. The apparatus of claim 11, wherein the TA value in each of the multiple UE Rx–Tx time difference reports is associated with a time point within a predetermined report offset from a corresponding uplink measurement occasion of the multiple uplink measurement occasions.

14. The apparatus of claim 10, wherein the multiple uplink reference signals comprise at least one of multiple Sounding Reference Signals (SRSs), multiple Physical Random Access Channels (PRACHs), and multiple Demodulation Reference Signal (DMRSs).

15. The apparatus of claim 10, wherein the at least one processor is further configured to receive a trigger to acquire updated ephemeris data of the satellite prior to generating the multiple UE Rx–Tx time difference reports.

16. The apparatus of claim 10, wherein a time difference between transmitting each of the multiple UE Rx–Tx time difference reports and transmitting a corresponding one of the multiple uplink reference signals is less than a threshold to mitigate impact of timing drift caused by movement of the satellite.

17. A non-transitory computer-readable medium storing computer executable code for wireless communication of a user equipment (UE), comprising code to:

determine multiple uplink measurement occasions that are within a predetermined offset from an Epoch time of a satellite, the predetermined offset corresponding to a number of slots, for transmitting multiple reference signals to the satellite in a non-terrestrial network (NTN);

generate, based on Global Navigation Satellite System (GNSS) location data of the UE and ephemeris data of the satellite, multiple UE Rx–Tx time difference reports, each of the multiple UE Rx–Tx time difference reports containing a respective timing advance (TA) value, that are linked to the multiple uplink measurement occasions, respectively;

predict the TA value in each of the multiple UE Rx–Tx time difference reports up to a time instance when a corresponding one of the multiple uplink reference signals is received by a base station via the satellite;

transmit the multiple UE Rx–Tx time difference reports to the satellite at multiple time points; and transmit the multiple uplink reference signals to the satellite on the uplink measurement occasions.

* * * * *